Aug. 26, 1958     T. BUDZICH     2,848,954
WOBBLER TYPE MULTIPLE PISTON PUMP Filed Oct. 28, 1955     3 Sheets-Sheet 1

INVENTOR.
Tadeusz Budzich
BY
John Joseph Roethel
Attorney

United States Patent Office

2,848,954
Patented Aug. 26, 1958

2,848,954

WOBBLER TYPE MULTIPLE PISTON PUMP

Tadeusz Budzich, Watertown, N. Y.

Application October 28, 1955, Serial No. 543,374

13 Claims. (Cl. 103—173)

This invention relates to fluid pumps and motors and more particularly to an axial type of multiple-piston variable displacement pump or motor.

Hydraulic system are widely used in manufacturing and other industries for the purpose of transmitting and controlling power. In many applications, particularly in machine tool and aircraft applications, there is an urgent need for a pump of compact design and low weight and which is capable of generating pressures up to 5000 p. s. i. In machine tool, aircraft or the like applications the required pump must be capable of satisfying the following requirements:

(a) The pump must be basically of the variable output-constant pressure type wherein the pump discharge pressure remains substantially constant although the discharge volume may vary from zero to maximum in response to the changes in demand for fluid in the hydraulic circuit being serviced.

(b) Although the pump must be of the variable output-constant pressure type, it may be required to have the characteristic of being able to maintain a predetermined substantially constant maximum output volume once a predetermined pump input speed has been attained, even though the pump may be operating at a speed in excess of said predetermined speed. That is, the pump and its control system may be required to be so constructed and arranged that once a predetermined input speed has been attained, any increase in the speed of operation will not result in an increase in the output volume.

(c) The internal mechanism of the pump must be capable of working at high revolution rate, the upper limit being on the order of 10,000 R. P. M. Therefore, the pump must have as few moving parts as possible and must have substantially perfect rotary balance.

(d) The pump must have a high mechanical efficiency and therefore must have a minimum of moving parts subject to hydraulic reaction force, which at the high pressure the pump must be capable of operating may be inherently large.

It is an object of the present invention to provide an improved pump satisfying the above requirements and having an inherent characteristic of low unit weight in relation to the output volume and high discharge pressure it is capable of generating. It is a further object of the present invention to provide an improved control system for controlling the performance characteristics of the pump. By the use of various combinations of the basic components of the improved pump controlling system embodied in the present invention, completely different performance or discharge characteristics may be obtained. Proper selection and combination of the basic components of the control system would provide at least the following variations in discharge characteristics of the pump:

(1) Constant displacement at constant R. P .M.

(2) Manually variable displacement at constant R. P. M.

(3) Variable displacement; volume output changing to maintain constant pressure; and the maximum output of the pump remaining constant at constant R. P. M.

(4) Variable displacement; volume output changing to maintain constant pressure; and the maximum output of the pump being manually controlled.

(5) Variable displacement; volume output changing to maintain constant pressure; and the maximum output of the pump being controlled by a speed sensitive servo-mechanism coupled into the control system, said maximum output being constant over a wide range of input R. P. M.

(6) Variable displacement; volume output changing to maintain constant pressure; and the maximum output being controlled by a speed sensitive servo-mechanism adjustable to any predetermined output by means of a manual control.

(7) Variable displacement; constant volume output with varying input R. P. M. over wide range of speeds and controlled by a speed sensitive servo-mechanism.

Other advantages, features and objects of the present invention will be apparent from the following description and appended claims, reference being had to the accompanying drawings forming a part of this specification wherein like reference numerals designate corresponding parts in the several views.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
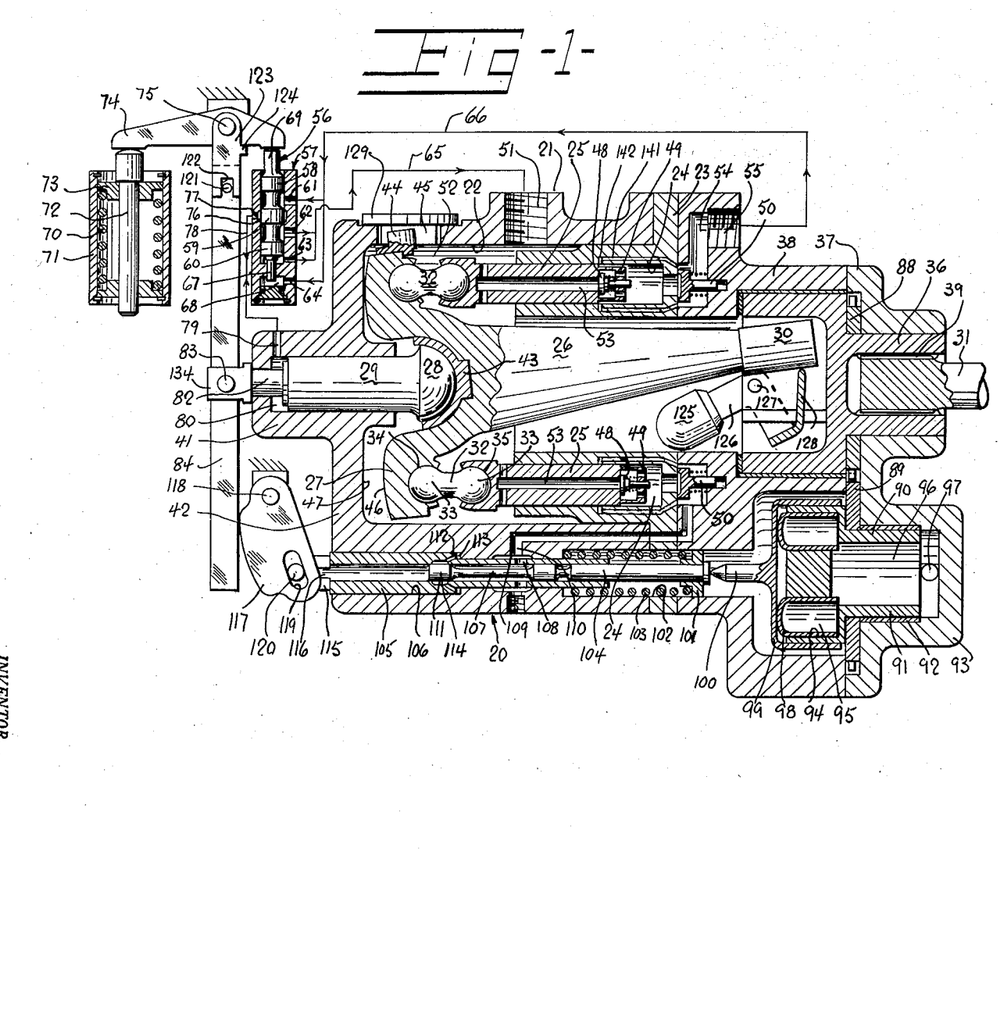
Fig. 1 is a section taken longitudinally of the pump body of the pump mechanism embodying the present invention, some of the parts being shown in fragmentary detail and some of the pump control system being shown diagrammatically for purposes of disclosure.

In general and with particular reference to Fig. 1 of the drawing, the pump, generally designated 20, embodying the present invention, comprises a pump body 21 having a longitudinally extending bore 22 open at one end. Received within the open end of the bore 22 is a cylindrical cylinder block 23 having a series of axially extending cylinder bores 24 therein. In the illustrated embodiment nine of these cylindrical bores 24 are provided although it will be understood that the number may vary as desired. An axially reciprocable piston 25 is received within each cylinder bore 24. The pistons 25 are reciprocated by means of a wobbler or rocker generally designated 26. The wobbler 26 is generally conical or mushroom shaped in appearance having its large or plate end 27 supported in part on a ball element 28 carried on the end of a feed plunger or control stem 29 and its small end 30 operatively associated with a driveshaft 31, as will be explained in greater detail.

It will be noted that each piston 25 is coupled to the wobbler plate end 27 in such a manner that the piston is positively reciprocated in both directions of movement, that is, on the pumping stroke and on the retraction stroke. The connecting means between each piston and the wobbler comprises a connecting rod 32 having a spherical portion 33 at each end thereof. One of the spherical rod ends 33 is seated and retained in a complementary socket 34 in the plate end 27 of the wobbler 26 and the other spherical rod end 33 is seated and retained in a complementary socket 35 in the end of an adjacent or corresponding piston 25. The rods 32 provide an articulated driving connection adapted to transmit wobbling motion of the plate end 27 to the pistons 25 whereby the same are reciprocated within the respective cylinders to cause fluid pumping action to take place. The foregoing ball and socket connection of the rods 32 to the wobbler 26 and pistons 25 permits the necessary angular changes to be made in the relationship of the wobbler to the pistons whereby the pumping stroke may be adjusted, as will be more fully explained.

The driving connection between the driveshaft 31 and the small end 30 of the wobbler 26 comprises a drive element 36 in part rotatably journalled in a pump body end plate 37 and in part housed within a collector ring housing 38. The collector ring housing 38 is interposed between the end plate 37 and the cylinder block 23, suitable bolt means (not shown) or the like securing the collector ring housing 38 and the cylinder block 23 to the pump body 21. Similarly, suitable bolt means or the like (not shown) secure the end plate 37 on the collector ring 38. The drive element 36 is connected to the drive shaft 31, as by splines 39, to rotate therewith. The drive element 36 is shown in enlarged detail in Figs. 7 and 8. As shown in Fig. 8 the drive element is provided with a radially extending slot 40 which receives the small end or stem 30 of the wobbler 26. As will be more fully explained, the stem 30 of the wobbler is radially positionable within the slot 40 to afford a driving connection between the driving element 36 and the wobbler 26. It will be noted that the stem end 30 of the wobbler 26 is freely movable in a radial direction relative to the side walls of the slot 40.

The plate end 27 was described as being supported in part by a ball element 28 carried on one end of a feed plunger or control stem 29. The feed plunger or control stem 29 is axially movable along a longitudinal axis coincident with the longitudinal axis of the drive shaft 31. The control stem 29 is supported in a suitable boss 41 formed in the integral pump body end plate 42. The ball or semi-spherical element 28 on the control stem 29 is seated in a concave bearing or socket element 43 carried in the plate end 27 of the wobbler 26. This ball and socket arrangement permits movement of the wobbler relative to the control stem. The relative movement of the wobbler 26 about the control stem 29 is a rocking movement since means are provided to ensure that no rotation of the wobbler 26 about its longitudinal axis will occur. At one side thereof the wobbler plate end 27 carries a rigidly secured stud 44. The stud 44 is in slidable engagement with the side walls of a longitudinally extending slot 45 in the pump body 21.

When the small or stem end 30 of the wobbler 26 is positioned radially of the axis of the driveshaft 31, as shown in Fig. 1, for example, the drive element 36 will swing and carry the stem end 30 in a circular path about the axis of the shaft 31. As has been described, the plate end 27 of the wobbler 26 is held against displacement radially of the longitudinal axis of the pump 20 by the ball and socket arrangement consisting of the ball element 28 carried by the feed plunger or control stem 29 coacting with bearing element 43 in the plate end 27. Further, the plate end 27 of the wobbler 26 is held against rotation by the stud 44 coacting with the side walls of the slot 45 in the pump body. Thus, the movement of the plate end 27 resulting from the stem end 30 being swung in a circular path is a wobble movement. It will be noted that in the present embodiment the plate end 27 is provided with a contoured or toroid shaped surface 46 thereon, which surface is held in contact with the inner surface 47 of the pump body end plate 42. The contact is a point contact and as the wobbler describes a wobbling movement the point of contact will describe a circumferential path about the axis of the feed plunger or control stem 29.

Since the plate end 27 of the wobbler 26 is connected by the connecting rods 32 to the respective pistons 25, the wobbling motion of the wobbler 26 will cause a reciprocating motion of the pistons 25. It will be understood that some of the pistons will be moving on a fluid pumping stroke and the remainder of the pistons will be on a suction stroke. Internal fluid flow within the pump is controlled by internal check valves 48 carried within valve cages 49 secured to the pistons 25 and by check valves 50 preferably carried in the collector ring housing 38. It will be understood that the check valves 48 could be mounted within the cylinder block rather than carried on the piston ends. It will be noted that pump body 21 is provided with a fluid inlet 51 which leads into the pump body chamber 52 encompassing or housing the plate end 27 of the wobbler 26. Each piston 25 is provided with a fluid passageway 53 providing a fluid flow pathway from the chamber 52 into the respective cylinder bores 24. The check valve 48 is provided to restrict the flow of fluid through the piston passageway 53 to the time when the piston 25 is on a suction stroke.

Cylinder rings 142 are provided in the cylinder bores 24. The cylinder rings 142 are connected by drilled holes 141 with collector ring cavity 54 and are therefore subject to discharge pressure. Each piston 25 just before the end of its suction stroke, that is, just before the reversal of direction of the motion of the piston takes place, uncovers a cylinder ring 142. Due to the sinusoidal form of the piston displacement the check valve 48 related to the particular piston 25 is partially closed, the amount of the hydraulic fluid coming into cylinder 24 at this moment being very small. As soon as a cylinder ring 142 is uncovered by a piston 25 and is therefore in direct communication with fluid in the cylinder space 24, the check valve 48 shuts and the fluid in the cylinder space 24 becomes subjected to high pressure. On the remaining short duration part of the suction stroke, fluid is supplied from collector ring 54 and the piston 25 acts as a motor taking some of the load from the small end 30 of the wobbler 26. When a piston 25 reaches the end of its suction stroke and a reversal of direction takes place, the corresponding check valve 50 will lift and high pressure fluid will start flowing from cylinder 24 to collector ring cavity 54. During the first small portion of the discharge stroke the high pressure fluid will flow both through check valve 50 and from cylinder ring 142 through the drilled passages 141. Once the end of the piston 25 cuts off the cylinder ring 142 from fluid contained in the cylinder 24, all the fluid will pass through the check valve 50 on the discharge stroke.

Thus, referring to Fig. 1, the top piston 25 is shown in a maximum out or retracted position. The cylinder ring 142 is open to fluid in cylinder 24. The check valve 48 is shut as is the check valve 50. From this position any further rotation of the drive element 36 will result in the opening of the check valve 50.

In Fig. 1, the bottom piston 25 is illustrated as having just completed the discharge stroke and is in its maximum in position. The check valve 48 is closed and due to the zero instantaneous discharge so is the check valve 50. From this point any further rotation of the drive element 36 will result in the check valve 48 becoming open as the suction stroke begins, the check valve 50 remaining closed.

It must be noted that although by the use of the cylinder ring 142 a slight reduction in the effective discharge stroke of the pump occurs, there is no loss on the overall efficiency of the pump.

The advantages of using the cylinder ring 142 may be briefly summarized as follows:

(1) For zero pump output the position of wobbler 26 lies off the center line of the feed plunger or control stem 29 and drive element 36. Since the wobbler 26 is inclined at a small angle to the axis of rotation this will facilitate the start of the pumping action from zero flow position.

(2) The hydraulic reaction force keeping the plate end 27 of the wobbler 26 in contact with the surface 47 is increased making the control system more positive.

It will be understood that although in the illustrated embodiment the cylinder rings 142 were used, other equivalent means to provide an initial angular inclination to the wobbler 26 could be used. For example, a spring could be provided to act on the small end 30 of the wobbler 26, the spring to be housed in drive element 36 to revolve therewith. The spring would provide the initial force necessary to maintain the wobbler 26 slightly inclined in the same manner as results from the use of the cylinder rings 142.

The amount of fluid moved by each piston 25 during its pressure or pumping stroke is proportional to the magnitude of the swaying movement of the plate end 27 of the wobbler 26 as its stem end 30 is swung about in a circular path by the driving element 36. The magnitude of swaying motion is dependent on the angle of inclination of the longitudinal axis of the wobbler 26 relative to the axis of rotation of the driveshaft 31. In Fig. 1, the wobbler 26 is shown at its maximum degree of tilt, a position in which the stem end 30 is disposed at the radial outer end of the driving element slot 40. In this position the degree of wobble or sway is at a maximum and the stroke of the pistons will be a maximum. Correspondingly, the displacement of the pump will be a maximum.

In the position in which the longitudinal axis of the wobbler 26 coincides with the axis of rotation of the drive element 36, the latter would rotate freely about the stem end 30 and would have no effect on the wobbler 26. Displacement of the pump would be zero since there would be no reciprocation or pumping action of the pistons. In actual practice the wobbler axis would not be permitted to coincide with the drive element axis of rotation but would be inclined at an angle related to the position of cylinder ring 142 for zero displacement. Because of the construction and arrangement of the cylinder rings 142, no pumping action will take place for a small portion of the stroke.

As the toroid surface 46 of the wobbler 26 rolls around the inner surface 47 of the pump body end plate 42 causing the pistons 25 to reciprocate, considerable hydraulic reaction force is transmitted from the pistons 25 through the connecting rods 32 to the wobbler plate end 27. This force is transmitted from wobbler plate end 27 through semi-spherical bearing element 43 to the ball element 28 of the feed plunger or control stem 29. At the same time the component of the above force will tilt the wobbler 26 keeping the wobbler plate end 27 continuously in contact with the pump body end plate 42. The magnitude of the component of the hydraulic reaction force transmitted to the pump body end plate 42 at the moving point of contact of the toroid surface 46 with end plate surface 47 depends on the length and position of the cylinder ring 142.

As stated, the magnitude of the swaying movement of the plate end 27 of the wobbler is dependent on the angle of inclination of the wobbler longitudinal axis relative to the axis of rotation of the drive element 30. Adjustment of the angle of inclination is obtained by movement of the feed plunger or control stem 29 inwardly or outwardly, that is, to the right or left respectively as viewed in Fig. 1, as the case may be. To increase pumping action the feed plunger 29 is moved inwardly causing the plate end 27 to be tilted about a fulcrum at the point of contact of its toroid surface 46 and pump body end plate surface 47. To decrease pumping action the feed plunger is withdrawn or moved outwardly permitting the hydraulic reaction force to urge the wobbler 26 to follow the plunger thereby decreasing the angular inclination of the latter relative to the drive element axis.

In the illustrated embodiment of the invention the control system governing the inward and outward movement of the plunger 29 basically consists of two servo-systems. The control circuit of this embodiment provides a pump having the discharge characteristics listed under item 5 of the enumerated variations earlier listed herein. It will be understood that the variations in discharge characteristics enumerated do not require structural changes in the pump as hereinabove described but that the variations are obtainable by control circuit modifications. With regard to the two servo-systems forming the control system of the present embodiment, one servo-system is a pressure responsive control and the other is a speed responsive control. The two systems are best viewed in Figs. 1 and 2.

First, the servo-system controlling pump output in response to pressure demands will be described. This system comprises a spool valve 56 working within a spool valve body 57. The spool valve 56 is provided with three lands 58, 59 and 60 respectively. The spool valve body is provided with a series of ports 61, 62, 63 and 64. As shown by fluid circuit line 65, the space between the lands 59 and 60 and the space below the land 60 are normally connected through ports 62 and 63 with the suction side of the pump through pump inlet 51. The space between lands 58 and 59 is connected through port 61 and suitable connecting means as represented by fluid circuit line 66 with the pump discharge outlet, that is, to the high pressure side of the pump. Also connected to the high pressure side of the pump is port 64, the port at the lower end of the spool valve body 57. The spool valve 56 at the lower end thereof is in contact with a plunger 67 which projects into a chamber 68 connected to the port 64. At its upper end the spool valve 56 is provided with a portion 69 projecting beyond the spool valve body 57 where it is indirectly subject to the force of a spring 70 through beam 74.

The spring 70 is illustrated as a compression spring carried in a spring housing 71 secured in any convenient manner to the pump body 21. The spring housing contains a plunger 72 and a spring retainer 73 movable therewith. The plunger 72 is in abutting relationship to one end of a beam 74, the beam being fulcrummed intermediate its ends at 75. The opposite end of the beam 74 is in abutting relationship to spool valve portion 69.

It will be noted that spool valve body 57 is provided with a space 76 communicating with a port 77. The length of the space is such that when the spool valve 56 is in the position shown in Figs. 1 and 2, the land 59 thereon isolates space 76 and therefore port 77 from both ports 61 and 62. The space 76 is in direct communication through port 77 and fluid circuit 78 with port 79 in the boss 41 housing the feed plunger or control stem 29. The feed plunger or control stem 29 is in the nature of a piston movable within the cylindrical space 80 of the boss 41. The control stem 29 is secured by a pin 81 to a stud 82 which projects through the boss 41 end wall. The stud 82 carries a clevis portion adapted to be pivotally connected by a pin 83 to a servo-beam 84. Suitable oil seal means comprisings backing ring 85 and O ring 86 maintained in position by spring 87 are provided.

Before explaining the operation of the pressure servo control system, the second major component of the control circuit, the speed responsive control system, will be described.

Figures 2, 3, 4, 11:
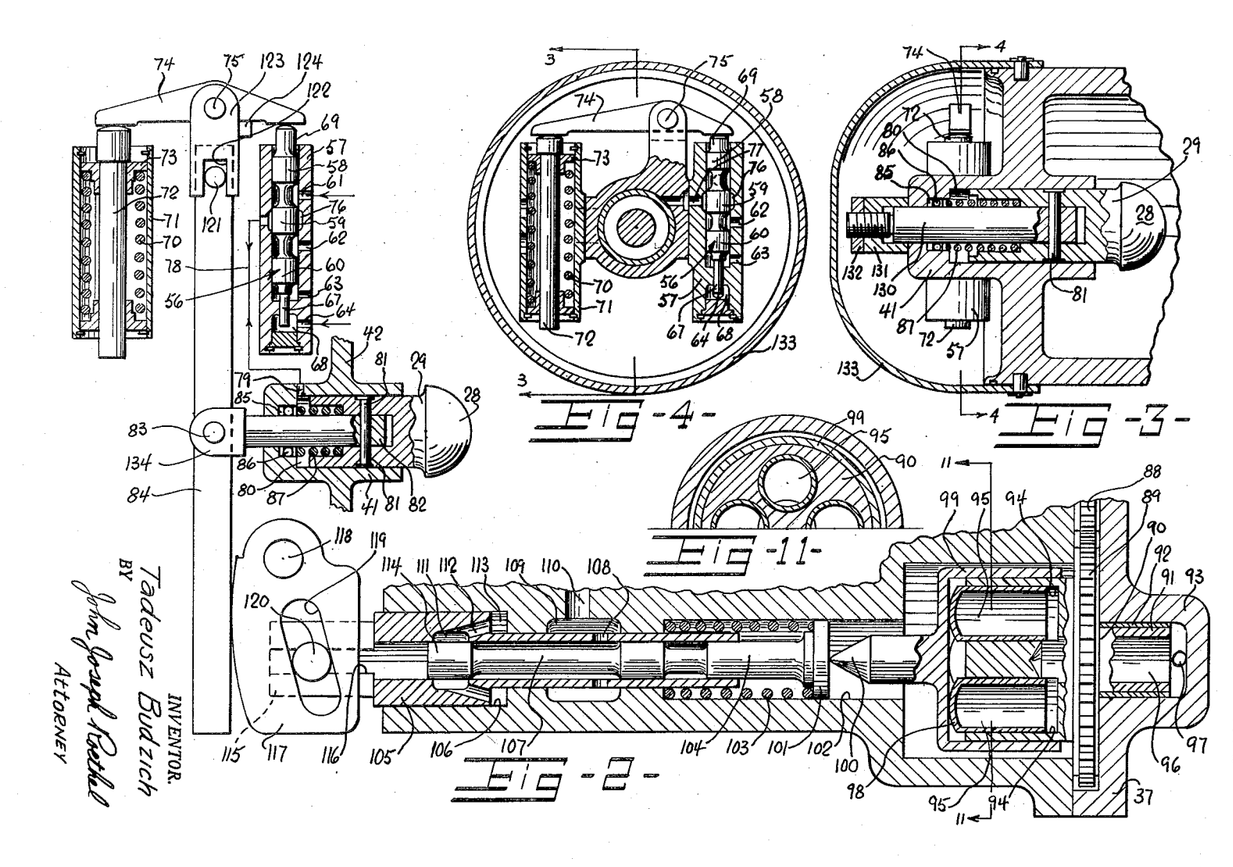
Fig. 2 is an enlarged view in part fragmentary of the control means shown in Fig. 1.
Fig. 3 is a sectional view of a portion of the pump showing a modification of some of the control system components of the pump, said section being taken substantially through line 3—3 of Fig. 4 looking in the direction of the arrows.
Fig. 4 is a sectional view taken substantially through line 4—4 of Fig. 3 looking in the direction of the arrows.
Fig. 11 is a sectional view taken substantially through line 11—11 of Fig. 2 looking in the direction of the arrows.

The drive element 36 has secured thereto a spur gear 88 which is in mesh with a second spur gear 89 carried by a hydraulic governor body member 90. The governor body member 90 which is a substantially cylindrical shaft is journalled at one end 91 thereof in a sleeve bearing 92 secured within a boss 93 on the pump body end plate 37. The governor body is provided with a series of radially spaced cylindrical bores 94. The cylindrical bores 94 house hollow piston type plungers 95 which are adapted to receive fluid under pressure through a large passageway 96 within the governor body member 90. The boss 93 housing the member 90 is provided with a fluid inlet port 97. The plungers 95 are movable in a direction parallel to the axis of rotation of the governor body member and their closed ends 98 are in abutting relation to shell member or cylindrical slide 99 encompassing part of the governor body member and provided with a pointed protuberance 100 thereon, the point lying on the axis of rotation of the governor body member. The pointed end 100 is in abutting relation to a spring retainer 101 carried in a longitudinally extending bore 102 in the pump body 21. The spring retainer 101 is a portion of a spool valve 104 housed within the bore 102 and is acted upon by a spring 103. The spool valve 104 is longitudinally movable within a slave cylinder 105 which in turn is longitudinally movable in a stepped cylindrical bore 106 in the main pump body 21. The space surrounding the reduced portion 107 of the spool valve communicates through port 108 with space 109 in the pump body 21. Space 109 is connected through port 110 through an appropriate passageway directly to high pressure fluid from the collector ring 38. The space 111 in the slave cylinder 105 communicates directly through ports 112 with cylinder space 113, which depending on the position of spool valve land 114, may be open either to high pressure fluid or exhaust. As illustrated in Fig. 2, land 114 is in position to isolate space 113 both from exhaust and high pressure fluid—in other words, it is in a neutral position. The end 115 of slave cylinder 105 is slotted at 116 and engages a cam element 117 which is free to swing around fulcrum pin 118. The cam element 117 is provided with a slot 119 in which a pin 120 suitably fixed in the slotted end 115 is engaged. The cam element 117 bears against the flat surface of servo-beam 84 and is adapted to swing the servo-beam about the pin 83 as a fulcrum. It will be noted that the servo-beam is provided at the end thereof adjacent the beam 74 with a pin 121 engageable in the slot 122 of a slotted lever 123 and thus is adapted to swing the slotted lever about pivot pin 75. The slotted lever 123 is provided with a dog 124 in abutting relation to the beam 74. When the lever 123 is pivoted in a counterclockwise direction as viewed in Figs. 1 and 2, the dog 124 will engage the beam 74 causing the same to swing in a counterclockwise direction influencing the position of the spool valve 56 which, as will be explained, affects the control stem 29 and ultimately also the servo-beam 84.

The manner in which the control system affects the pump output will now be described. As illustrated in Figs. 1 and 2, the ports 63 and 62 are connected to the exhaust or low pressure side of the system. The ports 61 and 64 are connected to the high pressure side of the system. Therefore, the space between the lands 59 and 60 on the spool 56 is filled with low pressure fluid and the space between lands 59 and 58 is filled with high pressure fluid. The port 77 connects the space 76 through fluid line 78 and port 79 with the cylinder 80 in which the control stem 29 acts as a piston. Therefore, any movement of the spool 56 downwardly as viewed in Figs. 1 and 2 will direct high pressure fluid to the space 76 and thus to cylinder 80. Movement of the spool 56 in the opposite direction will connect space 76 and cylinder 80 to exhaust. The high pressure fluid entering through port 64 acts on plunger end 67 tending to push the spool 56 upwardly. The end 69 of the spool 56 is in abutting relation to the beam 74, the other end of which is subjected to the force of spring 70. The beam 74 being free to swing about the fulcrum pin 75, the hydraulic pressure acting on the cross section area of the plunger end 67 is balanced only by the resisting force of the spring 70. The preload on the spring 70 is so selected that it balances hydraulic force acting against the plunger end 67 at the maximum discharge pressure. When the opposing hydraulic and spring forces are so balanced, the land 59 on the spool 56 prevents flow of fluid through spool valve body space 76 to either port 61 or 62.

Should the discharge pressure of the pump increase for any reason, the increased pressure acting on plunger end 67 will cause the spool 56 to move upwardly as viewed in Fig. 2, causing the beam 74 to pivot about its fulcrum and thereby compress the spring 70. A fluid exhaust circuit will then be set up leading from the cylindrical space 80 in which the control stem 29 moves, through fluid flow line 78 to port 77 leading into space 76 of the spool valve body and then into the exhaust side of the system through port 62. Since the control stem or feed plunger 29 is subject to hydraulic reaction force, the opening of the cylindrical space 80 to exhaust will result in the control stem moving into the cylinder or to the left as viewed in Fig. 2. As the plunger or stem 29 moves to the left the angle of inclination of the rocker or wobbler 26 will decrease thereby reducing the effective stroke of the pistons 25. The resulting decreased output of the pump will cause the discharge pressure to fall and the spring 70 will overbalance the hydraulic force acting on plunger end 67. The spool 56 will then be moved downwardly, as viewed in Fig. 2, causing the land 59 thereon to cut off flow of fluid from cylindrical space 80 to the exhaust side of the system thereby preventing any further retrogression of the control stem or plunger 29 into the cylindrical space 80. The angle of inclination of the wobbler or rocker 26 will thus become stabilized.

Should the discharge pressure of the pump decrease for any reason, such as upon increased demand for fluid in the hydraulic circuit being serviced by the pump, the reaction of the pressure control circuit will be as follows: The spring 70 acting through beam 74 will overbalance the fluid pressure acting on plunger end 67 forcing the latter downwardly as viewed in Fig. 2. A fluid flow circuit from the high pressure outlet 55 of the pump will be opened to the control stem cylinder 80, the circuit comprising fluid circuit line 66, port 61, spool valve body space 76, port 77, fluid circuit line 78 and port 79 into cylinder space 80. The high pressure fluid entering cylinder space 80 will force the control stem or feed plunger 29 outwardly or to the right as viewed in Fig. 2 causing the wobbler or rocker 26 to be tilted to a greater angle. The increased angular relationship of the wobbler or rocker 26 will be reflected in a longer piston 25 stroke causing an increase in the output of the pump. As the pump pressure rises the spool 56 will move upwardly, as viewed in Fig. 2, until the land 59 closes off the valve spool body space 76 preventing any further high pressure fluid from being supplied to the cylinder space 80.

Brief mention was made earlier that in actual practice the wobbler axis would not be permitted to coincide with the drive element 36 axis of rotation or in other words, that the angle of inclination of the wobbler or rocker 26 is not permitted to attain a zero angle. The slot 40 in the driving element 36 is short enough at the inner end thereof to maintain contact with the peripheral surface of the driven end 30 at its angularly displaced position so that there will be no play between the slot surface and driven end peripheral surface. The spring 87, although primarily retaining the backing ring 85 and seal 86 in position, also reacts against the control stem or feed plunger 29 so as to keep it continuously in contact with socket element 43 and wobbler 26. With the wobbler or rocker 26 out of a neutral position centrifugal force assists in tilting the rocker further until the pressure control system is effective to stabilize the discharge of the pump. Preferably, the length of the control stem or feed plunger 29 is such that when in its innermost position relative to the cylindrical space 80 it too will maintain the wobbler or rocker 26 at a minimum required angle.

The operation of the speed responsive control system hereinabove described will now be explained. As described the speed responsive control system basically consists of a hydraulic governor arrangement driven at a speed proportional to the input speed; a hydraulic slave servo-mechanism of a force multiplying type; a rectifying means comprising a cam rectifying the governor speed input, the speed input being proportional to the square of the R. P. M., to a linear quantity; and a servo-beam relating the speed responsive control system to the pressure servo-control system.

As has been described the hydraulic governor is driven by gear 88 related to driving element 36, the gear 88 being in engagement with gear 89 secured to hydraulic governor body member 90. The hydraulic governor body member cylinders or bores 94 contain the axially movable piston plungers 95 which bear against the end wall of shell member 99, the latter being carried by the body member 90 for axial movement relative thereto. The governor body member 90 as well as the hollow plungers 95 are filled with fluid. As the governor body member revolves, the fluid is subjected to centrifugal force. Since the centrifugal force on a fluid acts not only radially but also axially, the plungers 95 will be urged axially transmitting force to the shell member 99. The latter in turn through its conical tip 100 exerts force on the spring retainer 101, this force being resisted by the spring 103. Although under the action of the centrifugal force and pressure so generated some of the fluid leaks past clearances between the plungers 95 and their containing bores or cylinders 94, this fluid is replenished through port 97 connected to the low pressure side of the pump.

The spring 103 is a calibrated spring and resists movement of the shell member 99 axially to the left, as viewed in Fig. 2, until a predetermined governor speed is reached. This predetermined speed is the speed which will give the maximum or rated discharge of the pump. Should the speed be increased above the predetermined speed which would give normal maximum output, the stroke of the pistons 25 must be adjusted to compensate for the increased reciprocal rate at which the pistons are operating.

Thus, as the speed of the pump increases a point is reached when the centrifugal force tending to push the plungers 95 to the left as viewed in Fig. 2 will overcome the spring 103 resistance. This results in a high pressure circuit becoming effective to change the position of the control stem or plunger 29 thereby to adjust the piston 25 stroke. The high pressure circuit comprises passageway 110, space 109, port 108, the space around the reduced portion 107 of the spool valve 104, space 111 normally blocked off by land 114, port 112 and slave cylinder space 113. The slave cylinder 105 under influence of the increased fluid pressure in the cylinder space 113 is moved to the left, as viewed in Fig. 2, thereby positioning the space 111 therein over the land 114 and cutting off the high pressure fluid from the cylinder space 113. The movement of the slave cylinder 105 to the left is transmitted through the slotted end 115 of the slave cylinder to the cam 117 by the pin 120 working in the cam slot 119. The action of the cam 117 affects the servo-beam 84. As the lower end of the beam 84 is swung to the left, as viewed in Fig. 2, under the influence of the cam 117, the beam will pivot around the pivot stud 83 in a clockwise direction. The pin 121 on the upper end of the beam 84 will through its engagement with the slotted lever 123 cause the latter to pivot around the fulcrum pin 75 in a counter-clockwise direction. The dog 124 on the lever 123 will abut the beam 74 and cause the latter to be swung in a counter-clockwise direction against the force of the spring 70. Thus, the spring 70 will resist movement of the slave cylinder 105 to the left. As the beam 74 swings in a counter-clockwise direction, and is thus lifted out of engagement with the upper end of plunger 69, the fluid pressure under the spool valve will cause the same to rise connecting the port 77 to the exhaust side of the system. Under the influence of the hydraulic reaction forces present in the pump, the control stem or feed plunger 29 will be forced to the left as viewed in Fig. 2 thereby permitting the wobbler or rocker 26 to decrease its angle of inclination and shorten the operative strokes of the pistons 25. As the wobbler 26 assumes its new position, the movement of the control stem 29 to the left results in the servo-beam 84 being bodily carried to the left so that it rotates in a counterclockwise direction about its point of contact with the cam 117. The slotted lever 123 is relieved of its load permitting the beam 74 to rotate in a clockwise direction under the influence of spring 70. The spool valve 56 is restored to its original or neutral position and the port 77 is closed off from the exhaust side of the system. The new position and the total movement of the control stem 29 is thus directly proportional to the movement of spool valve 104.

Thus, as the R. P. M. of the pump is increased above a certain specified value, the volume output per revolution is proportionately reduced. However, since the number of revolutions per unit of time has proportionately increased, the volume output of the pump remains constant. From the foregoing described new position of the control stem 29, which position is equivalent to the increase in speed of the pump drive shaft 31, the pressure responsive control system operates as follows: If the pressure in the system would suddenly increase the spool valve 56 under action of plunger 67 would open cylinder 80 to exhaust. The feed plunger or control stem 29 would move inwardly thus decreasing the output of the pump. The servo-beam 84 would turn in an anti-clockwise direction revolving around pin 121 and losing contact with cam 117.

For a sudden decrease in pressure the beam 74 would have to turn clockwise from the equilibrium position to connect cylinder 80 with high pressure fluid acting through the spool valve 56. But since the servo-beam 84 is in contact with the cam 117, the pin 121 and the dog 123 prevent clockwise rotation of the beam 74 under action of the spring 70. Thus, the control in the direction of increasing pump output is inactive and the maximum output of the pump is controlled solely by the speed sensitive servo-mechanism.

It will now be assumed that the R. P. M. of the pump suddenly is decreased. The spring 103 then overbalances the centrifugal force acting on the plungers 95 causing the spool valve 104 to move to the right as viewed in Fig. 2. The space 111 will be uncovered by the movement of valve land 114 to the right relative thereto and will be connected to the exhaust side of the pump system. As a result of the decreased speed of the pump the pressure in the system will fall and the spring 70 will overcome the fluid force acting on the spool valve 56 causing the latter to move downwardly. High pressure fluid will be connected to cylindrical space 80 causing the control stem 29 to be moved outwardly, or to the right. The angle of inclination of the wobbler 26 will be increased thereby increasing the stroke of the pistons 25. The pump output will rise and the pressure will be restored.

As the control stem 29 moves to the right it will carry with it the servo-beam 84. The lower end of the servo-beam will push on the slave cylinder 105 causing the land 114 thereon to close the space 111 to the exhaust side of the system. Any further movement of the servo-beam 84 will result in the lower end thereof pivoting around its point of contact with the cam 117. Such pivotal movement will cause the beam 74, through the relationship of pin 121 with the slotted lever 123, to be swung in a counterclockwise direction against the force of the spring 70. The decreased force acting on the spool valve 56 permits the same to return to a neutral position and cease any further movement of the control stem or feed plunger 29.

It is believed apparent from the foregoing that the action of the speed responsive control system superimposed on the pressure responsive system gives the following results: The pressure responsive control system by controlling the position of the control stem or feed plunger 29 is able to adjust the volume output of the pump from maximum to zero to keep the pressure constant. But, as the R. P. M. of the pump increases above a predetermined value, the maximum output of the pump would increase proportionately assuming no change in the position of the control stem 29. It will be understood that the relative position of the control stem 29 in relation to the point of contact of the wobbler 26 with the pump end plate surface 47 determines only volume output per revolution and not the output of the pump per unit of time, the latter being proportional to the input R. P. M. As the R. P. M. increases above the predetermined value, the output of the pump per revolution must be reduced to keep the total output constant. In the present embodiment this means that as the R. P. M. increases the relative position of the control stem must be changed and this is done by the hydraulic governor and slave servo-mechanism. Below the predetermined R. P. M. point at which the pump is producing maximum output at full piston stroke, the speed responsive control system is not active. Above the predetermined R. P. M. the speed responsive mechanism is active or effective to reduce the pump piston stroke to maintain the maximum output at a predetermined constant. It must be understood that although the speed responsive control mechanism is effective above a predetermined speed to shorten the piston stroke of the pump, the action of the pressure responsive control system continues to regulate the volume output of the pump to maintain the pressure constant. In any situation the in-position of the control stem 29, equivalent to zero output, is unaffected but some of the outward limits of the control stem are cut short by the speed responsive control system.

An important feature of construction of the pump mechanism embodying the present invention is the provision of a means for dynamically balancing the wobbler 26 as the end 30 thereof is swung about in circular paths of varying radii. As the driven end 30 of the wobbler 26 describes a circular path of a magnitude proportional to the discharge volume of the pump the longitudinal axis of the wobbler generates a conical surface. The apex of the conical surface is the center of the hemi-spherical surface of the adjusting plunger or control stem 29. Therefore, although no rotation of the rocker or wobbler 26 takes place in relation to the back wall 42 of the pump body 21, each part of the wobbler is describing a circular path the radius of which is proportional to the distance to the apex of the generated conical surface. It will thus be obvious, on inspection, that rotary unbalanced forces are generated by the center of gravity of the rocker or wobbler 26 describing a circular path in relation to the center line of the mechanism, that is, the axis of rotation of the drive element 36. The unbalanced force is of course zero when the wobbler 26 is centrally located. At maximum discharge of the pump the unbalanced force is a maximum. At high R. P. M. this rotary unbalanced force is not only objectionable from the point of view of performance of the pump but cannot be tolerated in aircraft applications.

Figure 7:
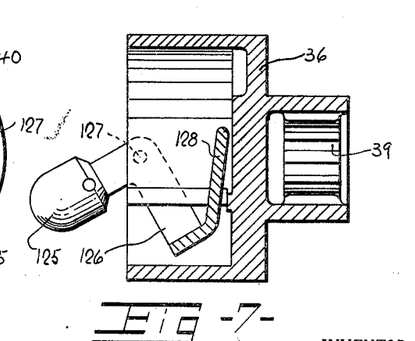
Fig. 7 is an enlarged sectional view of a portion of the pump drive mechanism shown in Fig. 1.
Figure 8:
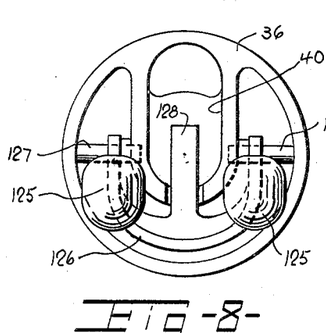
Fig. 8 is an end view taken from the left side of Fig. 7.

To counterbalance the unbalanced force an automatic compensatory balancing means is provided as best viewed in Figs. 1, 7 and 8. The balancing mechanism comprises a pair of weights 125, preferably of heavy metal, rigidly secured to a frame member 126. The frame member 126 is pivotally carried by pivots 127 on the driving element 36, the axis of pivotal movement being at right angles to and intersecting the axis of rotation of the element 36. The frame member 126 is provided with a tongue portion 128, the tongue being located on the side of the pivot axis opposite that on which the weights are located, the tongue end lying in contact with the end 30 of the wobbler 26. The tongue portion 128 is maintained in contact with the end portion 30 by the action of centrifugal force swinging the weights 125 away from the axis of rotation of the drive element but in a direction opposite to that in which the wobbler 26 is moving.

Thus, if the wobbler 26 is at a zero discharge position its center of gravity and the center of gravity of the weights 125 both would be at the center of rotation of the drive element 36, the mechanism being in balance. As the center of gravity of the wobbler moves away from the center of rotation of the drive element the center of gravity of the balancing mechanism also so moves, but in an opposite direction. Thus, the rotary balance is maintained, rotary moments being equal.

Brief mention was made of the stud 44 carried by the wobbler plate end 27, the stud being in slidable engagement with the side walls of the longitudinally extending slot 45 in the pump body 21. The stud 44 acts as a positive means to prevent any tendency of the wobbler 26 to rotate as the free end 30 thereof is swung around. The longitudinal axis of the stud or pin 44 is perpendicular to and intersects the longitudinal axis of the wobbler or rocker 26. The point of intersection is exactly at the center of the hemi-spherical surface of the bearing element 43. The motion of the wobbler 26 in relation to the pin or stud may be analized as follows: The rocker or wobbler 26 is movable in a plane perpendicular to that shown in Fig. 1, the wobbler 26 revolving around the center line of the stud 44. The wobbler is also free to move in a plane parallel to the plane of Fig. 1, the stud 44 then travelling along the path of the slot 45, which for ease of machining is shown carried in a plug 129. As the end 30 of the wobbler 26 describes a circular path in travelling with the driving element 36, a combination of relative rotary and sliding motion takes place between the pin or stud 44 and the side walls of the slot 45. It must be noted that pin 44 acts as a positive stop in so far as preventing the rotation of the wobbler 26 in relation to the cylinder block 23. When considering the equilibrium of forces within the mechanism it is believed apparent that the surface loads between the stud 44 and the slot 45 walls are very small and that the arrangement is mechanically sound.

In the opening statements concerning the present invention there were enumerated seven variations of discharge characteristics of which the basic pump mechanism was capable, which characteristics were dependent on the basic components of the control system used. In Figs. 3 and 4 there is illustrated an embodiment having a modified control system providing the characteristics enumerated under item 4, that is, Variable displacement; volume output changing to maintain constant pressure; and the maximum output of the pump being manually adjustable. It will be noted that this embodiment does not include a speed servo-control system. In this embodiment the control stem or feed plunger 29 is provided with a stud 130 somewhat longer than the stud 82 of the previously described embodiment. This stud 130 protrudes through the end wall of the boss 41, the protruding end being threaded to receive an adjusting nut 131 and a lock nut 132. Thus, positioning of the nuts 131 and 132 permits the maximum discharge of the pump to be limited and manually adjusted. The nuts 131 and 132 limit the movement of the control stem or plunger 29 to the right as viewed in Fig. 3 and thereby limit the maximum tilting of the rocker or wobbler 26.

As shown in Figs. 3 and 4, in this embodiment the controls are housed in a sealed dome 133 adapted to be filled with low pressure oil. The sealed dome 133 housing the control elements is connected to the fluid inlet 51, Fig. 1, through a passageway in the pump body end plate 42.

A further illustration of the manner in which the control system may be varied to give a different discharge characteristic to the pump may be given. For example, item 7 enumerates a "variable displacement" pump; constant volume output with varying input R. P. M. over wide range of speeds and controlled by a speed sensitive servo-mechanism. The actual arrangement of the controls to give the discharge characteristic of item 7 is the same as illustrated in Fig. 2. However, the spring 70 must be stiff enough to give an operating pressure higher than the unloading pressure of any safety valve in the hydraulic circuit. Then no matter what the pressure in the system the spool 56 is always in a position to connect the high pressure port 61 with space 76 and cylinder space 80. The adjusting plunger or control stem 29 will be maintained at the limit of its movement to the right as viewed in Fig. 2. When the R. P. M. of the pump reaches the predetermined R. P. M. corresponding to the rated maximum volume output of the pump, the speed responsive control will start swinging the servo-beam 84 in a clockwise direction around pivot pin 83 swinging the slotted lever 123 in a counterclockwise direction. The beam 74 will also be swung in a counterclockwise direction opposing the action of the stiff spring 70 and permitting the spool 56 to move upwardly thereby opening a circuit from the cylinder space 80 to the low pressure side of the pump. The control stem 29 will move to the left carrying the servo-beam 84 with it and thus relieving the latter of the pressure being exerted by the slave cylinder 105. The stiff spring 70 will then be permitted to swing the beam 74 in a clockwise direction to restore the spool 56 to a neutral position. Thus, as the R. P. M. of the pump exceeds that at which maximum rated output of the pump is attained, the volume output per R. P. M. is automatically decreased, keeping the total output constant.

Should the R. P. M. input suddenly decrease, the cam 117 would not exert any force on the servo-beam 84. The stiff spring 70 through the beam 74 would push the spool 56 downward in the spool valve body 57. High pressure fluid would flow to cylinder space 80 urging the control 29 outwardly or to the right as viewed in Fig. 2. The servo-beam 84 would also be carried to the right causing its lower end to push the slave cylinder 105 into its chamber 113. This slave cylinder movement will continue until the space 111 therein overrides the land 114 on spool 104 cutting off space 113 from the low pressure side and preventing the further exhaust of fluid therefrom. The cam 117 would not be able to move any further to the right. Any further movement of the control stem 29 to the right would cause the servo-beam 84 to swing around its point of contact with the cam 117 affecting the slotted lever 123 at the other end. The action of the stiff spring 70 would be counterbalanced and the spool 56 would return to its neutral position and the system would be stabilized until a change in R. P. M. occurs again. By making the stud 82 with means for varying the effective length thereof, such as by providing means for moving the clevis portion 134 at the stud end in relation to the adjacent end of the boss 41, the maximum output of the pump could be manually varied, since the further to the right the control stem 29 is permitted to move the greater the piston stroke achieved.

Figures 5, 6, 9, 10:
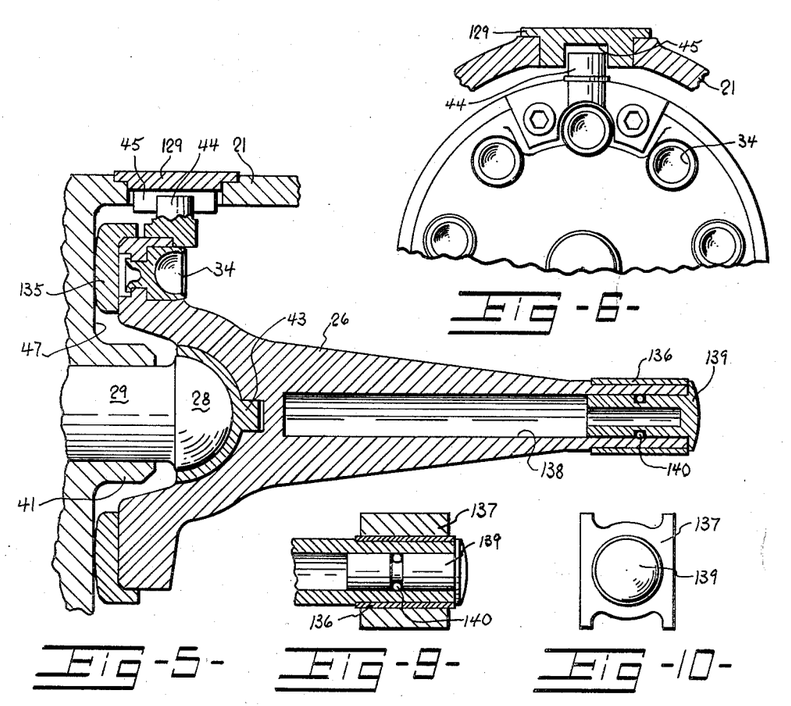
Fig. 5 is a sectional view in part similar to portions of Fig. 1 illustrating a modification of the pump drive member.
Fig. 6 is an end view taken from the right side of Fig. 5 with a portion of the pump body shown in section.
Fig. 9 is a view corresponding in part to the right end portion of the pump drive member shown in Fig. 5 illustrating a modification thereof.
Fig. 10 is an end view taken from the right side of Fig. 9.

Figs. 5, 9 and 10 have not been discussed in detail to this point but they merely illustrate structural modifications. Fig. 5, for example, illustrates how hard steel shoe 135 could be provided and secured to the plate end of the wobbler. The shoe 135 would have the toroid surface adapted to roll around the pump end plate surface 47.

As shown in Fig. 5 the end 30 of the wobbler 26 is provided with a hard steel sleeve 136 which engages the walls of the slot 40 in the driving element 36. As shown in Figs. 9 and 10, the end 30 of the wobbler 26 could be provided with specially shaped block 137 slidable in the slot 40.

To lighten the wobbler 26 it may be hollowed out as at 138, a suitable plug 139 provided with an oil seal 140 being provided to keep out any stray fluid seeping therein to cause unbalance.

In summarizing some of the advantages of the pump embodying the present invention, the first thing that must be noted is that the pump is dynamically balanced. The gyrations of the wobbler 26 cannot set up any vibrations in the pump such as would render it useless at the high speeds it must operate. Further, it must be noted that the pump requires no roller, ball or the like bearing units. And to repeat, simple variations in the controls embodied in the present invention provide a high pressure, high output and efficient pump particularly well suited to meet any demands of a hydraulic circuit, a pump particularly adapted to meet the demands of an aircraft hydraulic system.

I claim:

1. A multiple piston pump comprising a housing means having at one end a fixed end plate, said housing means including cylinder block means having a plurality of axially disposed cylinders therein, piston means reciprocable within each cylinder, and a wobbler member effective to reciprocate said piston means, said wobbler member having a plate portion and a stem portion, said plate portion at one side having rolling contact with said fixed end plate, means positively interconnecting the other side of said plate portion with each piston means, rotatable drive means journalled in said housing means at the other end thereof, a driving connection between said stem portion and drive means whereby the latter is effective to swing the stem portion in a circular path about the axis of rotation of the drive means to impart a wobble action to said plate portion, and control means including a control plunger having bearing engagement with said plate portion at said one side thereof, said control plunger longitudinal axis coinciding with the axis of rotation of the drive means, said control plunger by selective movement being effective to vary the effective angle of the wobbler member thereby to vary the piston means pumping stroke.

2. A multiple piston pump comprising a housing means having inlet and outlet ports, rotatable drive means journalled in one end of said housing means, cylinder block means contained within said housing means having a plurality of axially disposed cylinders therein, said cylinders communicating alternately with said inlet and outlet ports through inlet and outlet valve means, piston means disposed for movement in said cylinders, and a wobbler member effective to reciprocate said piston means, said wobbler member having a plate portion and a stem portion, said plate portion at one side having rolling contact with a fixed end plate of said housing means, means positively interconnecting the other side of said plate portion with each piston means, said stem portion being operatively engaged by said drive means for swinging movement thereby in a circular path about the axis of rotation of the drive means, said stem portion being freely movable radially of said axis of rotation, said swinging movement of the stem portion imparting a wobble movement to said plate end, and control means including a feed plunger having bearing engagement with said plate portion at said one side thereof, said feed plunger longitudinal axis coinciding with the axis of rotation of the drive means, said feed plunger by selective manipulation being effective to vary the effective angle of the wobbler thereby to vary the piston means pumping stroke.

3. A multiple piston pump comprising a housing means having inlet and outlet ports, rotatable drive means journalled in one end of said housing means, cylinder block means contained within said housing means having a plurality of axially disposed cylinders therein, said cylinders communicating alternately with said inlet and outlet ports through inlet and outlet valve means, piston means disposed for movement in said cylinders, and a wobbler member effective to reciprocate said piston means, said wobbler member having a plate portion and a stem portion, said plate portion at one side having contact with an end plate of said housing means and at the other side having operative connection with each piston means, said stem portion being operatively engaged by said drive means for swinging movement thereby in a circular path about the axis of rotation of the drive means, said stem portion being freely movably radially of said axis of rotation, said swinging movement of the stem portion imparting a wobble movement to said plate portion, the latter maintaining rolling contact with said housing means end plate during such wobble movement, and control means for varying the effective angle of said wobbler member, said control means including a chamber in said housing means, a feed plunger disposed for movement in said chamber and having bearing engagement with said plate portion, fluid conducting means providing communication between said inlet and outlet ports and one end of said chamber, and a pressure operated valve located between said ports and said chamber, said valve normally connecting said chamber with said inlet port and being operative under pre-determined fluid pressure to establish fluid flow from said outlet port to said chamber, said feed plunger through variations in pressure in said chamber being selectively movable to vary the effective angle of the wobbler member thereby to vary the piston means pumping stroke.

4. A multiple piston pump comprising a housing means having inlet and outlet ports, rotatable drive means journalled in one end of said housing means, cylinder block means contained within said housing means having a plurality of axially disposed cylinders therein, said cylinders communicating alternately with said inlet and outlet ports through inlet and outlet valve means, piston means disposed for movement in said cylinders, and thrust means in the form of a wobbler member effective to reciprocate said piston means, said wobbler member having a plate portion and a stem portion, said plate portion at one side having rolling contact with a fixed end plate of said housing means, the face of said fixed end plate being perpendicular to the axis of rotation of the drive means, means positively interconnecting the other side of said plate portion to said piston means, said stem portion being operatively connected to said drive means for swinging movement thereby while being freely movable relative to the axis of rotation thereof, and a control system for varying the effective angle of said thrust means relative to said axis of rotation, said control system including fluid conducting means, a chamber in said housing means, and a feed plunger disposed for movement with said chamber, said feed plunger having a spherical end portion engaging bearing means in said thrust means, said thrust means being free to rock on said spherical end portion while maintaining rolling contact with said end plate face, said feed plunger through variations in pressure in said chamber being selectively movable to vary the effective angle of the wobbler thereby to vary the piston means pumping stroke.

5. A multiple piston pump comprising a housing means having inlet and outlet ports, rotatable drive means journalled in one end of said housing means, cylinder block means contained within said housing means having a plurality of axially disposed cylinders therein, said cylinders communicating alternately with said inlet and outlet ports through inlet and outlet valve means, piston means disposed for movement in said cylinders, and thrust means in the form of a wobbler member effective to reciprocate said piston means, said wobbler member having a plate portion and a stem portion, said plate portion at one side having rolling contact with a fixed end plate of said housing means, the face of said fixed end plate being perpendicular to the axis of rotation of the drive means, means positively interconnecting the other side of said plate portion to said piston means, said stem portion being operatively connected to said drive means for swinging movement thereby, and a control system for varying the effective angle of said thrust means relative to said axis of rotation, said control system including fluid conducting means, a chamber in said housing means, and a feed plunger disposed for movement within said chamber, said feed plunger having a spherical end portion engaging bearing means in said thrust means, said thrust means being free to rock on said spherical end portion while maintaining rolling contact with said end plate face, said feed plunger through variations in pressure in said chamber being selectively movable to vary the effective angle of the wobbler thereby to vary the piston means pumping stroke, and positioning means effective to prevent rotative movement of said plate portion relative to said housing means, said positioning means comprising a fixed pivot means on the periphery of said plate portion, the axis of said pivot means passing substantially through the center of said spherical portion of said feed plunger, said pivot means axis being substantially perpendicular to the longitudinal axis of said thrust means, and slot means in said casing, the longitudinal axis of said slot means being parallel to said drive means axis of rotation, said pivot means being free to turn and slide relative to said slot as the point of rolling contact between said thrust means and housing means in a circular path on said end plate face.

6. A multiple piston pump comprising a housing means including a cylinder block means having a plurality of axially disposed cylinders therein, piston means reciprocable within each cylinder, and a wobbler member effective to reciprocate said piston means, said wobbler member having a longitudinally extending stem portion, rotatable drive means journalled in said housing means operatively engaged with said stem portion and effective to swing the same in a circular path about the axis of rotation of said drive means to impart a wobble action to said wobbler member, said stem portion being radially movable relative to the axis of rotation of said drive means thereby affecting the degree of wobble of said wobbler member, and counterbalance means effective to maintain the dynamic balance of the system as the stem portion is swung about said axis of rotation, said counterbalance means comprising weight means, pivot means mounting said weight means on said drive means, said weight means being responsive to movement of said stem portion with the dynamic center of gravity thereof being diametrically opposed to the dynamic center of gravity of the wobbler member as the stem portion and weight means swing about said axis of rotation.

7. A multiple pump comprising a housing means having inlet and outlet ports, rotatable drive means journalled in one end of said housing means, cylinder block means contained within said housing means having a plurality of axially disposed cylinders therein, said cylinders communicating alternately with said inlet and outlet ports through inlet and outlet valve means, piston means disposed for movement in said cylinders, and a wobbler member effective to reciprocate said piston means, said wobbler member having a plate portion and a stem portion, said plate portion at one side having contact with an end plate of said housing means and at the other side having operative connection with each piston means, said stem portion being operatively engaged by said drive means for swinging movement thereby in a circular path about the axis of rotation of the drive means, said stem portion being freely movable radially of said axis of rotation, said swinging movement of the stem portion imparting a wobble movement to said plate portion, the latter maintaining rolling contact with said housing means end plate at all times, and control means including a feed plunger having bearing engagement with said plate portion at said one side thereof, said feed plunger longitudinal axis coinciding with the axis of rotation of the drive means, said feed plunger by selective manipulation being effective to vary the effective angle of the wobbler member thereby to vary the piston means pumping stroke, and counterbalance means effective to maintain the dynamic balance of the system as the stem portion is swung about said axis of rotation, said counterbalance means comprising weight means pivotally mounted on said drive means, said weight means being responsive to movement of said stem portion with the dynamic center of gravity thereof being diametrically opposed to the dynamic center of gravity of the wobbler as the stem portion and weight means swing about said axis of rotation.

8. A multiple piston pump comprising a housing means having inlet and outlet ports, rotatable drive means journalled in one end of said housing means, cylinder block means contained within said housing means having a plurality of axially disposed cylinders, said cylinders communicating alternately with said inlet and outlet ports through inlet and outlet valve means, piston means disposed for movement in said cylinders, and thrust means in the form of a wobbler member effective to reciprocate said piston means, said wobbler member being operatively connected to said drive means for movement thereby at an angle with respect to the axis of rotation of said drive means, and a control system for automatically controlling the angularity of said thrust means in response to pressure variations at said outlet port, said control system comprising a pressure responsive servo-mechanism and a speed responsive servo-mechanism, each mechanism being effective to actuate a common control means, and said control means being responsive to said servo-mechanisms to selectively vary the thrust means angle thereby to vary the piston means pumping stroke.

9. A multiple piston pump comprising a housing means having inlet and outlet ports, rotatable drive means journalled in one end of said housing means, cylinder block means contained within said housing means having a plurality of axially disposed cylinders, said cylinders communicating alternately with said inlet and outlet ports through inlet and outlet valve means, piston means disposed for movement in said cylinders, and thrust means in the form of a wobbler member effective to reciprocate said piston means, said wobbler member being operatively connected to said drive means for movement thereby at an angle with respect to the axis of rotation of said drive means, and a control system for automatically controlling the angularity of said thrust means in response to pressure variations at said outlet port, said control system comprising a pressure responsive servo-mechanism and a speed responsive servo-mechanism, each mechanism being effective to actuate a common control means, said speed responsive servo-mechanism including hydraulic governor means coupled to said drive means, and rectifying means effective to transmit movement of a part of said hydraulic governor means to said control means, and said control means being responsive to said servo-mechanisms to selectively vary the thrust means angle thereby to vary the piston means pumping stroke.

10. A multiple piston pump comprising a housing means having inlet and outlet ports, rotatable drive means journalled in one end of said housing means, cylinder block means contained within said housing heans having a plurality of axially disposed cylinders, said cylinders communicating alternately with said inlet and outlet ports through inlet and outlet valve means, piston means disposed for movement in said cylinders, and thrust means in the form of a wobbler member effective to reciprocate said piston means, said wobbler member being operatively connected to said drive means for movement thereby at an angle with respect to the axis of rotation of said drive means, and control means for automatically controlling the angularity of said thrust means in response to pressure variations at said outlet port, said control means including a chamber in the other end of said housing means, a feed plunger disposed for movement in said chamber and having bearing engagement with said thrust means, fluid conducting means establishing communication between said inlet and outlet ports and one end of said chamber, and a pressure operated valve located between said ports and chamber, said valve normally connecting said chamber with said inlet port and operative under predetermined fluid pressure to establish fluid flow from said outlet port to said chamber, said plunger through variations in pressure in said chamber being selectively movable to vary the thrust means angle thereby to vary the effective piston means pumping stroke.

11. A multiple piston pump comprising a housing means having inlet and outlet ports, rotatable drive means journalled in one end of said housing means, cylinder block means contained within said housing means having a plurality of axially disposed cylinders, said cylinders communicating alternately with said inlet and outlet ports through inlet and outlet valve means, piston means disposed for movement in said cylinders, and thrust means in the form of a wobbler member effective to reciprocate said piston means, said wobbler member being operatively connected to said drive means for movement thereby at an angle with respect to the axis of rotation of said drive means, and control means for automatically controlling the angularity of said thrust means in response to pressure variations at said outlet port, said control means including a chamber in the other end of said housing means, a feed plunger disposed for movement in said chamber and having bearing engagement with said thrust means, fluid conducting means establishing communication between said inlet and outlet ports and one end of said chamber, and a pressure operated valve located between said ports and chamber, said valve normally connecting said chamber with said inlet port and operative under predetermined fluid pressure to establish fluid flow from said outlet port to said chamber, said plunger through variations in pressure in said chamber being selectively movable to vary the thrust means angle thereby to vary the effective piston means pumping stroke, and adjustable means limiting the maximum thrust means angle, said adjustable means including a cylindrical extension on said feed plunger projecting exteriorly of said housing means, and adjustable stop means carried on said extension.

12. A multiple piston pump comprising a housing means having inlet and outlet ports, rotatable drive means journalled in one end of said housing means, cylinder block means contained within said housing means having a plurality of axially disposed cylinders, said cylinders communicating alternately with said inlet and outlet ports through inlet and outlet valve means, piston means disposed for movement in said cylinders, and thrust means in the form of a wobbler member effective to reciprocate said piston means, said wobbler member being operatively connected to said drive means for movement thereby at an angle with respect to the axis of rotation of said drive means, and control means for automatically controlling the angularity of said thrust means in response to pressure variations at said outlet port, said control means including a chamber in the other end of said housing means, a feed plunger disposed for movement in said chamber and having bearing engagement with said thrust means, fluid conducting means establishing communication between said inlet and outlet ports and one end of said chamber, and a pressure operated valve located between said ports and chamber, said valve normally connecting said chamber with said inlet port and operative under predetermined fluid pressure to establish fluid flow from said outlet port to said chamber, said plunger through variations in pressure in said chamber being selectively movable to vary the thrust means angle thereby to vary the effective piston means pumping stroke, said control means further including a speed sensitive hydraulic governor means, torque transmitting means connecting said drive means to said governor means, and means responsive to said hydraulic governor means as the latter reflects variations in drive means input speed effective to control the pressure in said chamber.

13. A multiple piston pump comprising a housing means having inlet and outlet ports, rotatable drive means journalled in one end of said housing means, cylinder block means contained within said housing means having a plurality of axially disposed cylinders, said cylinders communicating alternately with said inlet and outlet ports through inlet and outlet valve means, piston means disposed for movement in said cylinders, and thrust means in the form of a wobbler member effective to reciprocate said piston means, said wobbler member being operatively connected to said drive means for movement thereby at an angle with respect to the axis of rotation of said drive means, and control means for automatically controlling the angularity of said thrust means in response to pressure variations at said outlet port, said control means including a chamber in the other end of said housing means, a feed plunger disposed for movement in said chamber and having bearing engagement with said thrust means, fluid conducting means establishing communication between said inlet and outlet ports and one end of said chamber, and a pressure operated valve located between said ports and chamber, said valve normally connecting said chamber with said inlet port and operative under predetermined fluid pressure to establish fluid flow from said outlet port to said chamber, said plunger through variations in pressure in said chamber being selectively movable to vary the thrust means angle thereby to vary the effective piston means pumping stroke, said control means further including a speed sensitive hydraulic governor means, a gear set connecting said drive means to said governor means, said hydraulic governor means including a rotor having a plurality of cylinders therein, hollow piston means disposed for movement in said cylinders, said hollow piston means being movable within said rotor cylinders by centrifugal force exerted on fluid contained within said rotor cylinders, said hollow piston means movement being transmitted to a cylindrical slide on said rotor, said slide being movable axially of said governor, calibrated spring means resisting movement of said slide, and a force multiplying mechanism comprising a sleeve valve and a stepped piston, said sleeve valve being responsive to movement of said governor slide against the force of said spring, said stepped piston being responsive to movement of said sleeve valve, and a rectifying means comprising a cam and slot means operative by said stepped piston, a servo-link engaged at one end by said cam, said servo-link being centrally pivoted on said feed plunger, said servo-link at its other end being operatively associated with said pressure operated valve, said governor means thereby being effective to reduce the angularity of said thrust means in proportion to increase in speed of the drive means above a predetermined input speed.

References Cited in the file of this patent

UNITED STATES PATENTS

| | | |
|---|---|---|
| 1,631,356 | Banning | June 7, 1927 |
| 1,977,424 | Blum | Oct. 16, 1934 |
| 2,087,567 | Blum | July 20, 1937 |
| 2,169,456 | Wahlmark | Aug. 15, 1939 |
| 2,402,244 | Elberty | June 18, 1946 |